Sept. 30, 1958   C. M. TERRY   2,854,025
AUTOMATIC BACK PRESSURE CONTROL VALVE
Filed Aug. 18, 1954   3 Sheets-Sheet 1

CHARLES MARION TERRY
INVENTOR.
BY
ATTORNEY

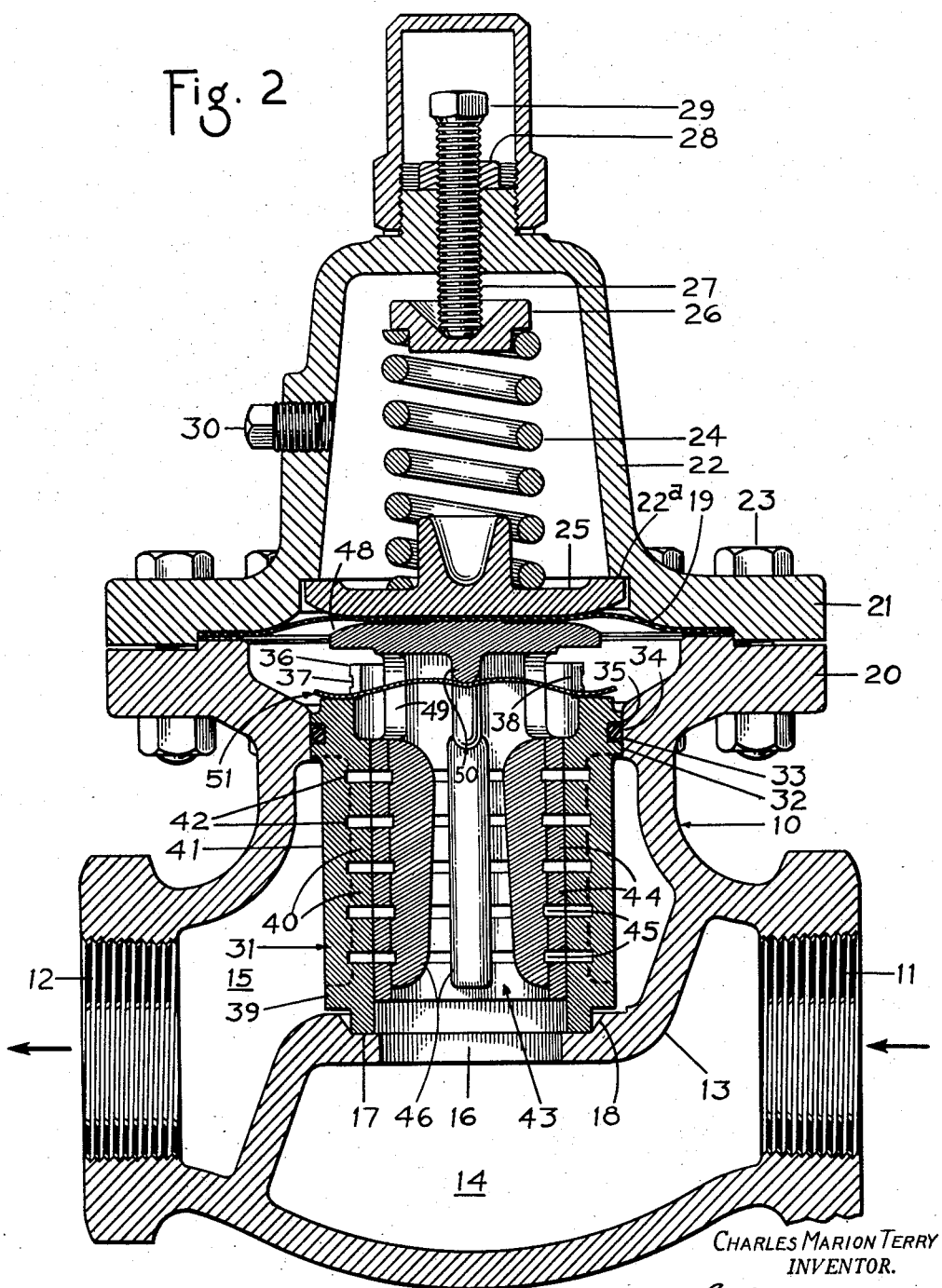

Sept. 30, 1958     C. M. TERRY     2,854,025
AUTOMATIC BACK PRESSURE CONTROL VALVE
Filed Aug. 18, 1954     3 Sheets-Sheet 3
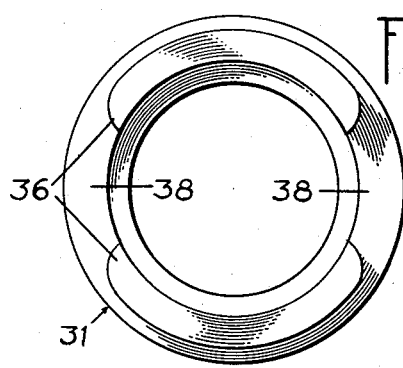
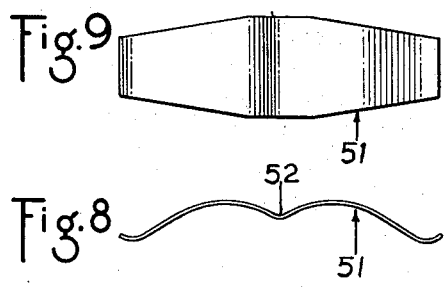
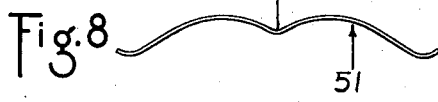
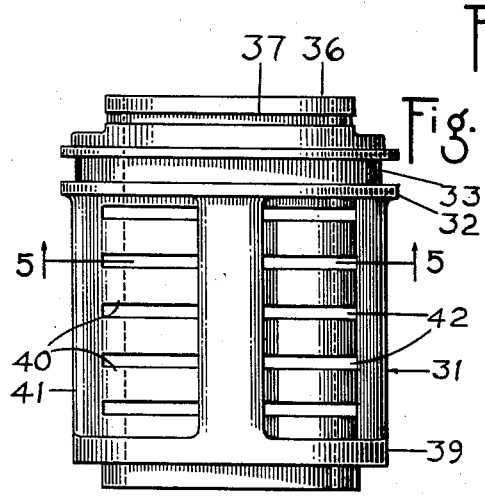
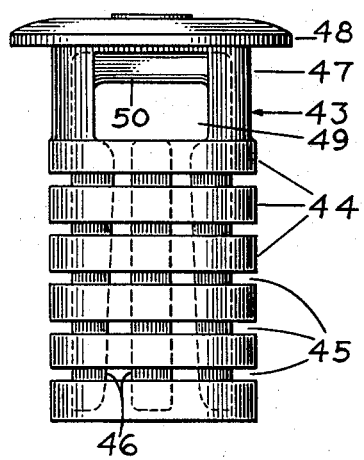
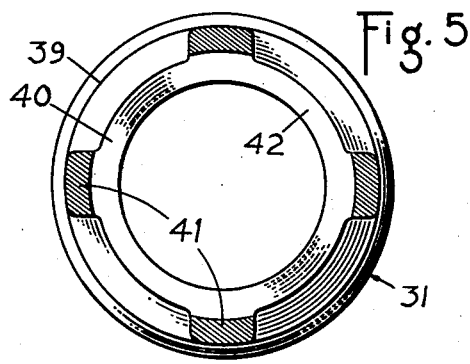
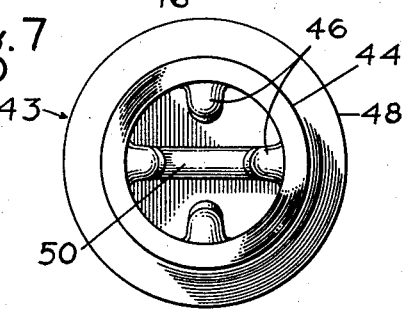
CHARLES MARION TERRY
INVENTOR.
BY *G. Lorenze Miller*
ATTORNEY United States Patent Office 2,854,025
Patented Sept. 30, 1958

2,854,025

AUTOMATIC BACK PRESSURE CONTROL VALVE

Charles Marion Terry, Decatur, Ill., assignor to A. W. Cash Valve Manufacturing Corporation, Decatur, Ill.

Application August 18, 1954, Serial No. 450,638

1 Claim. (Cl. 137—505.13)

This invention relates to an automatic pressure control valve.

The invention is more particularly concerned with an automatic back pressure control valve for use in refrigeration systems wherein such valves which are commonly known as "evaporator pressure valves," are sometimes placed in the suction line to prevent the evaporator pressure and temperature from dropping below a predetermined level.

Typical applications of such controls are found in water cooling or milk cooling systems, where freezing and other damage would result if evaporator pressure should drop too low, or in multiple systems wherein several evaporators are supplied by one condensing unit. Thus, different evaporators may be kept at different temperatures by maintaining the correct pressure in each evaporator.

In refrigerator systems, it is sometimes necessary to operate with a comparatively slight pressure drop through the valve, although a high rate of flow is required.

Such conditions require a valve having a large port area without excessive valve movement, which is undesirable, particularly when the valve is actuated by a flexible diaphragm which is subject to the fluid pressure.

In applicant's Patent No. 1,938,943, issued December 12, 1933, is disclosed a valve designed to satisfy the conditions above referred to and while the patented valve structure has been found measurably successful, use thereof has demonstrated the fact that it does not possess the desired sensitiveness in operation for the following reasons:

The piston in the patented structure is firmly fixed to the base portion of the valve casing and the cylinder is axially movable over the piston. Furthermore the lower part or skirt of the piston is tightly engaged within an aperture in the valve body partition wall, and such fixed position of the piston does not lend sufficient flexibility of movement thereof, particularly in view of body distortion due to temperature changes and pipe line stresses being transmitted to the piston, causing it to bind in the cylinder, slow down and occasionally actually stop the action of the valve.

A further disadvantage found in said patented structure is the difficulty experienced in removing the piston and cylinder for repair.

Very often the piston skirt would be so tightly engaged within the said aperture that considerable time and effort were necessary in its removal.

It is accordingly a primary object of this invention to provide a valve of the above noted character wherein the above noted objections to my prior valve construction are satisfactorily overcome.

A further object of the invention is to provide an automatic back pressure control valve including a cylinder loosely seated in the valve body and a free floating piston axially movable within the cylinder.

A still further object of the invention is to provide an automatic back pressure control valve for use in refrigeration systems which is of maximum sensitivity in action.

A still further object of the invention is to provide a valve of the character referred to which is capable of being assembled and disassembled in a minimum period of time and with a minimum expenditure of effort.

Other objects and advantages of the invention will become apparent in the course of the following detailed description, taken in connection with the accompanying drawings, wherein—

Fig. 2 is a sectional view corresponding to Fig. 1 but shown in an open position.

Fig. 3 is an elevational view of a cylinder included in the valve construction.

Fig. 4 is a top plan view of the cylinder.

Fig. 5 is a horizontal sectional view in the plane of line 5—5 on Fig. 3 and as observed in the direction of the arrows.

Fig. 6 is an elevational view of a piston included in the valve construction.

Fig. 7 is a bottom plan view of the piston.

Fig. 8 is an elevational view of a piston supporting spring.

Fig. 9 is a plan view of the spring.

Figure 1:
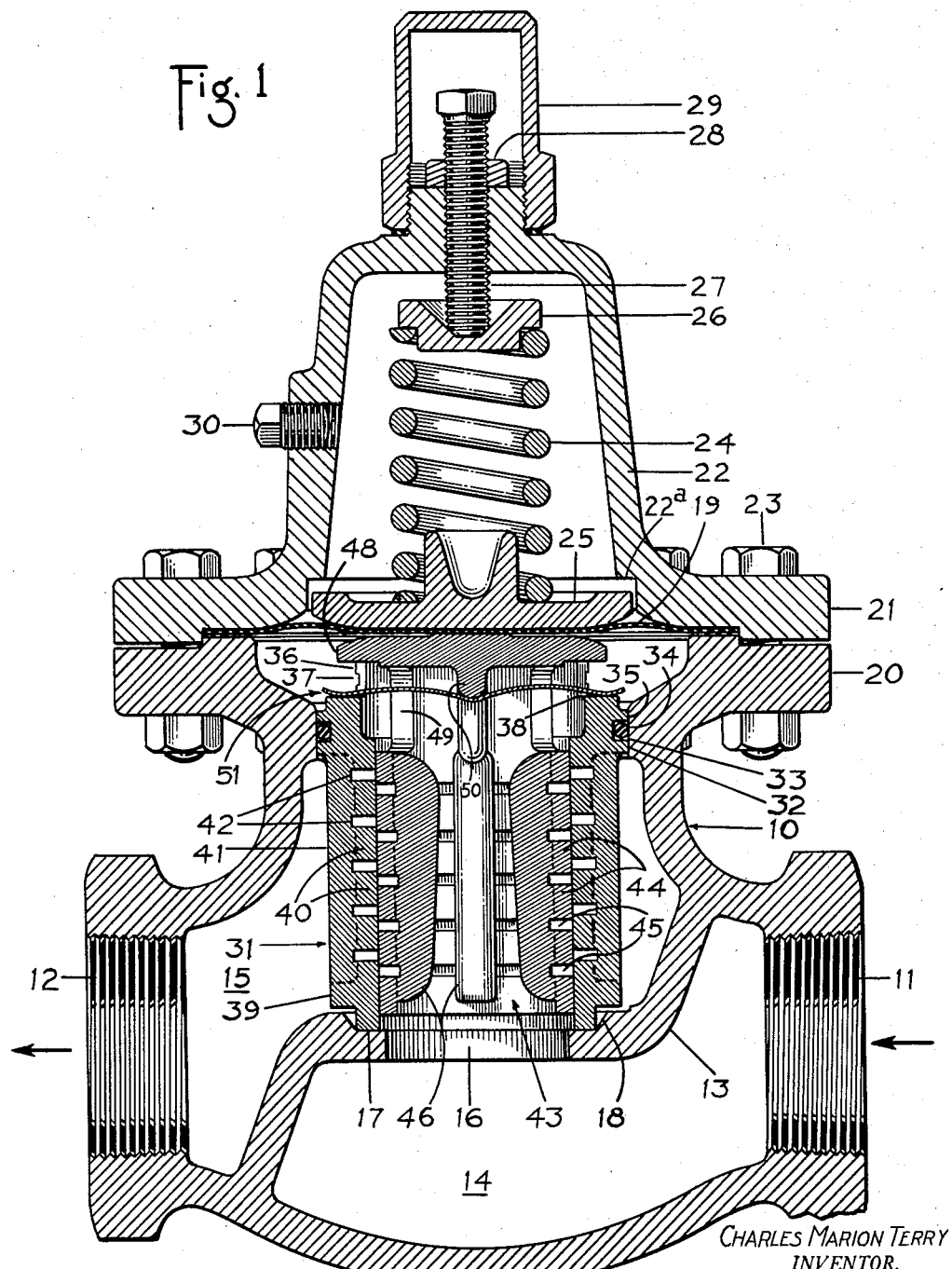
Fig. 1 is a vertical sectional view of the improved valve shown in closed position.

Referring now in detail to the drawings, the improved valve in general conformity with that of my said patent, comprises a hollow valve body portion or casing 10 provided with an inlet opening 11 and an outlet opening 12. Both the inlet and outlet openings have screw-threaded walls for connection of fluid conducting pipes to the casing.

A partition wall 13 extends diagonally across the interior of the valve casing and divides the space therein into an inlet chamber 14 and an outlet chamber 15. The partition 13 is provided in the intermediate horizontal portion thereof with a circular opening 16 and the partition is further provided with a depressed horizontal circular seat 17 surrounding the said opening and having an outwardly flared wall 18.

A flexible diaphragm 19 has the peripheral edge portion thereof clamped between a flange 20 on casing 10 and a co-operating flange 21 on a hollow spring casing 22 by means of bolts 23. The lower surface of the diaphragm 19 is exposed to the fluid pressure in chamber 14 and the spring casing 22 is provided with a coiled compression spring 24 whose lower end bears on a circular pressure plate 25, the lower face of which engages the diaphragm 19.

A button 26 is supported on the upper end of spring 24 and which is engaged by the lower end of an adjusting screw 27 which has threaded engagement with the upper end of casing 22 and which is maintained in any adjusted position by means of a locknut 28 which together with the upper end of screw 27 is shielded by a cap 29 threadedly engaged with the upper end of the spring casing 22. The casing 22 is provided with a pipe plug 30 which is not of importance so far as the invention is concerned.

The structure above described substantially corresponds to that disclosed in my said patent and the novelty in the present invention resides in the means for controlling the flow of fluid through the opening 16 from chamber 14 and to chamber 15 and same comprises a cylinder 31 whose lower end is loosely supported on the seat 17 and which adjacent its upper end is provided with a flange 32 having a circumferential groove 33 therein in which is disposed a fluid sealing gasket 34 engaged with a circumferential wall surface 35 of the casing 10. The cylinder projects above flange 32 in the form of segments 36 having grooves 37 for facilitating removal of the cylinder, and diametrically opposed recesses 38 exist between the ends of segments 36 for a purpose later to appear. The flared wall 18 facilitates the positioning of cylinder 31 on the seat 17. The cylinder also includes a lower flange 39 and the cylinder intermediate the flanges 32 and 39 comprises a series of vertically spaced rings 40 whose inner and outer wall surfaces are in true vertical and circumferential alignment.

The rings are rigidly connected by a plurality (preferably four) of integral external vertical ribs 41 and which construction provides vertically spaced annular ports 42 through which fluid flows from between the ring connecting ribs 41.

The structure further comprises a piston 43 of unitary construction and which is of generally cylindrical form and includes a series of vertically spaced rings 44 providing annular ports 45 therebetween and which ports are of the same vertical dimension as the ports 42 in the cylinder 31.

The inner and outer walls of the rings are in concentric cylindrical surfaces and the rings are rigidly connected by a plurality (preferably four) of internal vertical ribs 46.

The piston 43 projects above the uppermost ring 44 as at 47 and terminates in a diaphragm engaging plate 48. The upper portion 47 of the piston is provided with diametrically opposed openings 49 which are aligned with the recesses 38 in the cylinder 31 and the lower surface of plate 48 is provided with a diametrically extending rib 50.

An arched leaf spring 51 extends through the openings 49 and recesses 38 with its opposite ends bearing on the upper end of cylinder 31 and the mid portion of the spring is provided with a groove 52 which receives the rib 50.

The spring 51 acts in opposition to the spring 24.

Having set forth the structure in accordance with a preferred embodiment thereof, the operation is as follows:

The inlet and outlet openings 11 and 12 are connected to pipes which conduct fluid under pressure, as for example, ammonia in a refrigerating system. The direction of flow is indicated by arrows in Figs. 1 and 2.

As indicated in Fig. 2, the ports 42 and 45 in the cylinder and piston respectively are aligned or the valve is fully open.

In normal operation the two sets of ports 42 and 45 will remain in partial register sufficient to restrict the flow and maintain the desired pressure in the inlet chamber 14.

Should the fluid inlet pressure in said chamber 14 tend to increase, the diaphragm 19, piston 43 and pressure plate 25 will move slightly upward due to the unbalanced condition or difference between the force created by the pressure below the diaphragm 19 and the force created by the spring 24, thus bringing the ports 42 and 45 into closer register to increase the rate of flow, thereby reestablishing the balance of said forces.

Should the inlet pressure decrease, the diaphragm 19, piston 43 and pressure plate 45 will move slightly downward, thus restricting the flow to again restore a condition of balanced forces.

In Fig. 1 the diaphragm 19 and piston 43 are shown substantially depressed with the ports 42 and 45 wholly out of register, indicating the maximum downward travel of the piston 43, in that the lower face of the piston plate 48 contacts the upper face of the segments 36 of the cylinder 31, while in Fig. 2 said ports are shown in full registry for unrestricted passage of fluid through the valve, indicating the maximum upward travel of the piston 43, diaphragm 19 and pressure plate 25, such travel being limited by contact of the upper peripheral face of said pressure plate 25 with the shoulder 22$^a$ of the spring casing 22.

Since the ports are effective throughout the entire circumference, and since they all start to open or close simultaneously, a slight movement of the piston within the cylinder will produce a very large change in the available area of flow.

The movement of the piston 43 is controlled by the force of the spring 24 on the upper side of the diaphragm 19 and the force of the inlet fluid pressure on the lower side thereof. The purpose of the spring 51 is to hold the piston 43 in contact with the diaphragm 19 and to hold the cylinder 31 in contact with the seat 17 in the casing 10.

From the foregoing disclosure it will be seen that the improved valve is direct operated, packless, fully balanced, sensitive to slight pressure changes, simple in adjustment, of large capacity on low pressure differences due to multiple ported internal cylinder and piston unit, self-aligning, distortion free, and which possesses a long operating life.

It is further to be noted that the working unit is not in any way tied to the valve body, thereby greatly facilitating the removal thereof. The piston literally floats in a friction free, balanced working unit. And, too, distortion in the valve body created by changes in temperature and pipe line stresses are not transmitted to the working unit and therefore cannot impair the free movement of the piston in the cylinder, thus assuring trouble free operation.

Having set forth my invention in accordance with a preferred structural embodiment thereof, what I claim and desire to secure by U. S. Letters Patent is:

In an automatic back pressure control valve including a valve body having inlet and outlet fluid chambers at opposite sides of a partition wall therein having a fluid flow opening therein, a spring casing supported on said body, a diaphragm having its margin clamped between said body and said casing, and an adjustable coil spring in said casing reacting on the upper face of said diaphragm; the improvement comprising means for controlling the flow of fluid from said intake chamber to said outlet chamber through said opening, said means including a cylinder loosely supported on said partition wall and having a series of vertically spaced circumferential ports in the wall thereof and a cylindrical piston disposed within said cylinder and having vertically spaced circumferential ports for variable degrees of alignment with said first ports or for disalignment therewith according to the range of axial movement of the piston within the cylinder, said piston having a free floating support on said cylinder and including a plate freely engaged with the lower face of said diaphragm, and an outwardly arched leaf spring having its intermediate portion bearing on the lower face of said plate and having its opposite ends bearing on the upper end of said cylinder.

References Cited in the file of this patent

UNITED STATES PATENTS

| | | |
|---|---|---|
| 500,145 | Lucas et al. | June 27, 1893 |
| 1,938,943 | Terry | Dec. 12, 1933 |
| 1,944,486 | Bailey | Jan. 23, 1934 |
| 2,227,542 | Grove | Jan. 7, 1941 |
| 2,369,242 | Lawler | Feb. 13, 1945 |